March 23, 1926.

F. P. MYER 1,578,059

TROLLEY POLE SAFETY DEVICE

Filed March 13, 1925

INVENTOR
Frank P. Myer
BY
Frank Warren
ATTORNEY

Patented Mar. 23, 1926.

1,578,059

UNITED STATES PATENT OFFICE.

FRANK P. MYER, OF EVERETT, WASHINGTON.

TROLLEY-POLE SAFETY DEVICE.

Application filed March 13, 1925. Serial No. 15,188.

*To all whom it may concern:*

Be it known that I, FRANK P. MYER, a citizen of the United States, residing at Everett, in the county of Snohomish and State of Washington, have invented a certain new and useful Improvement in Trolley-Pole Safety Devices, of which the following is a specification.

My invention relates to improvements in safety devices for use in connection with the trolley poles of electrically driven cars and the object of my invention is to provide means that will operate automatically to pull a trolley pole down and hold the same down in case the trolley pole jumps off of the trolley wire and the circuit between the trolley pole and trolley wire is broken, thus preventing the trolley pole from being damaged or from damaging wires and the like with which it may come into violent contact.

Another object is to provide a trolley pole safety device that is controlled by the electric current passing from the trolley wire to the car and that is operated by compressed air.

Another object is to provide a safety device of this nature that may be rendered inoperative by the motorman if he so desires to permit the trolley pole to pass over a circuit breaker.

Other and more specific objects will be apparent from the following description taken in connection with the accompanying drawings.

Figure 1:
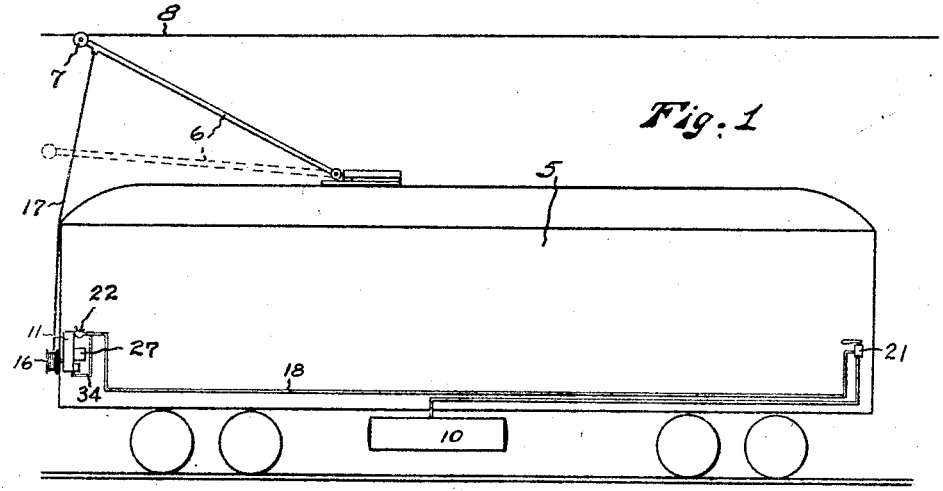
Figure 2:
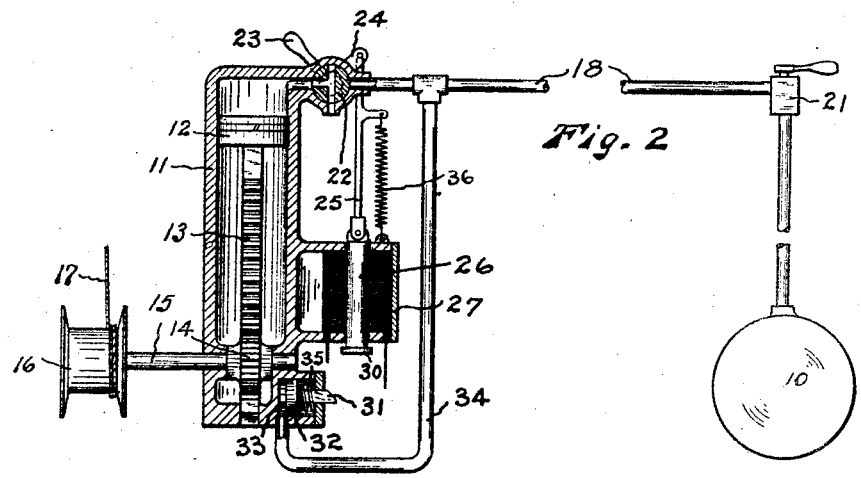

In the drawings Figure 1 is a somewhat diagrammatic view in side elevation of a car that is equipped with a trolley pole safety device constructed in accordance with my invention, and Figure 2 is a sectional view on a larger scale of the trolley pole safety devices.

Referring to the drawings, throughout which like reference numerals designate like parts, I show a trolley car 5, having the usual trolley pole 6, provided with a trolley wheel 7, arranged to run on trolley wire 8, said car having the usual tank 10 for compressed air.

In accordance with my invention I provide means in connection with the trolley pole 6 for pulling said trolley pole down in case the trolley wheel 7 leaves the trolley wire 8 on which it is arranged to run.

I accomplish this by the use of a cylinder 11 within which is a piston 12, having a piston rod 13 in the form of a rack bar that is arranged to mesh with a pinion 14 on a shaft 15 that extends crosswise of cylinder 11 so that reciprocation of piston rod 13 will rotate shaft 15. The shaft 15 preferably extends through the rear end of the car 5 and has a drum 16 secured thereon on which is wound a cable 17 that is secured to the upper end of the trolley pole. When the piston rod 13 is moved downwardly the drum 16 is rotated so as to wind the cable 17 thereon and pull the trolley pole down as shown by dotted lines in Fig. 1 and when the piston rod is raised or is permitted to move upward the trolley pole will be moved upward by the usual spring mechanism (not shown) connected therewith into the position shown by full lines in Fig. 1.

The piston 12 together with rack bar 13 is arranged to be moved downward by air pressure supplied through a pipe 18 that preferably extends to the front end of the car 5 and thence extends rearwardly and is connected with the tank 10 wherein air under pressure is stored. A valve 21 at the forward end of the car is arranged to be operated by the motorman. This valve is normally open but may be closed by the motorman under certain conditions to prevent operation of the pull down device.

A three way valve 22 is provided at the upper end of the cylinder 11 for controlling the inlet of compressed air to said cylinder. This valve has a handle 23 by which it may be manually operated and is further provided with another handle or lever arm 24 that is connected by a link 25 with the plunger or core 26 of a solenoid 27. The solenoid 27 is supplied with current from the trolley wire 8 so that when the circuit to said trolley wire is broken the solenoid will be de-energized.

The plunger or core 26 has a head 30 arranged to be engaged by a pawl 31 that is secured to a piston 32 disposed in a chamber 33. Pawl 31 is normally urged outwardly by compressed air admitted behind piston 32 through pipe 34 that connects with the main compressed air supply pipe 18 and is urged inwardly by a spring 35. The spring 35 is inoperative to move the piston 32 inwardly except when the air pressure behind such piston is relieved.

A spring 36 normally urges solenoid plunger 26 down and tends to hold the three way valve in a position at right angles to that shown in Fig. 2 in which position the valve will be open for the purpose of supplying compressed air from pipe 18 to cylinder 11.

In the usual operation of the device when the trolley wheel 7 is on the wire 8 the solenoid 27 will be energized and the plunger 26 will be held up in the position shown in Fig. 2 thus closing the valve 22 so far as the supply of compressed air is concerned and opening an exhaust passageway from the cylinder 11 to the atmosphere. This prevents the operation of the device so long as the trolley wheel 7 is on the trolley wire 8 and the circuit to the electromagnet 27 closed. If the trolley wheel 7 leaves the trolley wire 8 and the circuit to the electromagnet 27 is broken, then the spring 36 instantly moves link 25 and plunger 26 downwardly, thus closing passageway by which the cylinder 11 communicates with the atmosphere and opening a passageway from the air pressure pipe 18 into the cylinder 11. This permits compressed air to enter the upper end of cylinder 11 and drive piston 12 downwardly, thus rotating drum 16, winding up cable 17 and drawing trolley pole 6 down into a position as shown by broken lines in Fig. 1.

As plunger 26 moves downwardly the head 30 of said plunger strikes the inclined surface of pawl 31, moves the pawl 31 to the left and, as the head 30 rides over the point of the pawl 31, said pawl snaps into engagement with the head 30 and locks the plunger 26 down. This makes it impossible for the device to automatically release the trolley pole after the valve 22 has been thrown even though such trolley pole may be brought into contact with or strike against the trolley wire as it is being pulled down by the air entering cylinder 11.

If there is no air pressure in the pipe 18 the pawl 31 is retracted by spring 35 and becomes inoperative to engage with plunger 26 when said plunger is lowered. It will also be understood that when there is no air pressure in pipe 18 the piston 12 can not be operated.

In trolley lines there is often a short break in the circuit wire 8 between different sections of the line. At these breaks the cars usually run across from one section to the other by their own momentum and dummy wires or tracks that carry no current are provided for guiding the trolley wheel from one energized wire to the other. As the motorman approaches a break of this nature he may operate valve 21 to shut off the supply of compressed air and drain air pipe 18 thus preventing operation of the pull down device.

After the trolley pole is pulled down it can only be replaced by manually withdrawing the catch 31, turning the valve 22 back into the position shown in Fig. 2 and engaging the wheel 7 with the track 8 as the trolley pole moves upwardly.

The foregoing description and accompanying drawings clearly disclose a preferred embodiment of my invention, but it will be understood that this disclosure is merely illustrative and that such changes in the device may be resorted to as are within the scope and spirit of the following claim.

I claim:

The combination with a trolley car having a trolley pole provided with a trolley wheel arranged to make electrical contact with a trolley wire, of a cable connected with said trolley pole, a drum on which said cable is wound, means operated by compressed air for rotating said drum to wind said cable thereon and a solenoid energized by current from said trolley wire for rendering said compressed air means inoperative when said trolley wheel is in electrical contact with said trolley wire, and means operated by said compressed air for locking and unlocking the plunger of said solenoid.

In witness whereof, I hereunto subscribe my name this 7th day of March, A. D. 1925.

FRANK P. MYER.